United States Patent
Alipour

(10) Patent No.: US 8,833,245 B2
(45) Date of Patent: Sep. 16, 2014

(54) METHODS AND DEVICES FOR HEATING FOOD ITEMS

(76) Inventor: Ehsan Alipour, San Francisco, CA (US)

( * ) Notice: Subject to any disclaimer, the term of this patent is extended or adjusted under 35 U.S.C. 154(b) by 162 days.

(21) Appl. No.: 13/205,413

(22) Filed: Aug. 8, 2011

(65) Prior Publication Data

US 2012/0137898 A1 Jun. 7, 2012

Related U.S. Application Data

(60) Provisional application No. 61/371,176, filed on Aug. 6, 2010.

(51) Int. Cl.

| A23C 3/02 | (2006.01) |
|---|---|
| A47J 27/04 | (2006.01) |
| A47J 27/16 | (2006.01) |
| F24J 3/00 | (2006.01) |

(52) U.S. Cl.
CPC .. *F24J 3/00* (2013.01); *A47J 27/04* (2013.01); *A47J 27/16* (2013.01)
USPC ........................................................... 99/483

(58) Field of Classification Search
USPC .................................. 99/483, 331
See application file for complete search history.

(56) References Cited

U.S. PATENT DOCUMENTS

| 3,746,837 | A | * | 7/1973 | Frey et al. ...................... 219/387 |
|---|---|---|---|---|
| 3,963,898 | A | * | 6/1976 | Tuckwell ...................... 219/524 |
| 4,102,256 | A | * | 7/1978 | John et al. ...................... 99/372 |
| 4,617,908 | A | * | 10/1986 | Miller et al. .................... 126/20 |
| 4,968,516 | A | * | 11/1990 | Thompson .................... 426/233 |
| 5,363,748 | A | * | 11/1994 | Boehm et al. ................... 99/372 |
| 5,653,161 | A | * | 8/1997 | Nopanen et al. ................ 99/415 |
| 5,767,487 | A | * | 6/1998 | Tippmann ..................... 219/440 |
| 5,847,365 | A | * | 12/1998 | Harter et al. .................. 219/492 |
| 6,310,326 | B1 | * | 10/2001 | Wang .............................. 219/401 |
| 6,389,958 | B1 | * | 5/2002 | Ono .............................. 99/330 |
| 2008/0276808 | A1 | * | 11/2008 | Sus et al. ......................... 99/373 |

* cited by examiner

*Primary Examiner* — Dana Ross
*Assistant Examiner* — Renee L Miller
(74) *Attorney, Agent, or Firm* — GSS Law Group

(57) ABSTRACT

A cooking apparatus is provided comprising a liquid heating unit. The cooking apparatus further includes a top cover and a bottom cover disposed below the top cover, wherein one or both of the top cover and the bottom cover include one or more fluid passages for flowing heating fluid from the liquid heating unit. The cooking apparatus includes a vacuum member that is in fluid communication with a food tray disposed between the top cover and bottom cover. The cooking apparatus further includes a control system configured to direct the removal of one or more gases (e.g., air) from the food tray and circulate heating fluid through the fluid passages for a predetermined period of time.

12 Claims, 6 Drawing Sheets

METHODS AND DEVICES FOR HEATING FOOD ITEMS

CROSS REFERENCE TO OTHER APPLICATIONS

This application claims priority of provisional patent application Ser. No. 61/371,176 filed Aug. 6, 2010, the disclosure of which is hereby incorporated by reference in its entirety.

FIELD OF THE INVENTION

The invention generally relates to methods and devices for heating and cooling food items; more particularly, the invention relates to methods and devices for heating and cooling food items with the aid of a convective and conductive heat transfer medium.

BACKGROUND OF THE INVENTION

Sous-vide is a method for cooking that is intended to maintain the integrity of ingredients by heating them for an extended period of time at relatively low temperatures. Food is cooked for a long time, sometimes well over 24 hours. Unlike cooking in a slow cooker, sous-vide cooking uses airtight plastic bags placed in hot water well below the boiling point of water, typically around 60° C.

There are sous-vide devices available in the art. For example, U.S. Pat. No. 5,123,337 to Vilgrain et al. ("Vilgrain") teaches a sous-vide reheating device that includes at least two water heating chambers with each chamber having a heating device and a thermostat for controlling the temperature of the water in the chamber. The sous-vide device of Vilgrain includes an agitation mechanism to circulate the water in each chamber. Each chamber of Vilgrain is preferably divided into a plurality of sub-chambers with each sub-chamber having an associated timer to measure the amount of time elapsed for that sub-chamber. The device may include a plate storage and warming mechanism and has a work-space for preparing the sous-vide foods for service to consumers.

As another example, U.S. Pat. No. 6,012,381 to Hawn ("Hawn") teaches a convection meat cooker characterized by an elongated, cylindrical cooker tank which is provided on a portable cooker frame and includes concentric outer, middle and inner shells. The inner shell of Hawn defines an interior cooking chamber which is hermetically sealed by a door hinged to the outer shell at one end of the cooker tank. A cylindrical, annular heat chamber is defined between the middle and inner shells throughout the length of the cooker tank. A heat entrance port of Hawn extends from the middle shell and receives a propane-fueled burner for heating the cylindrical heat chamber and a heat exit port vents excess heat from the annular heat chamber. During operation, as the annular heat chamber is heated by the burner, Hawn teaches that heat is uniformly produced throughout the sealed cooking chamber by convection from within the annular heat chamber, which causes meat in the cooking chamber to cook quickly, in a partial vacuum, minimizing loss of natural moisture from the meat.

While there are methods and devices available for cooking food items, there is a need for improved methods and devices for cooking food items.

SUMMARY OF THE INVENTION

In an aspect of the invention, a cooking apparatus is provided, comprising a top portion and a bottom portion, the bottom portion disposed below the top portion. The cooking apparatus includes a vacuum member that is configured to remove one or more gases from a food tray disposed between the top portion and the bottom portion, wherein one or both of the top and bottom portions include one or more fluid passages configured to conduct heating fluid.

In another aspect of the invention, a cooking apparatus is provided, comprising a liquid heating unit. The cooking apparatus further includes a top cover and a bottom cover disposed below the top cover, wherein one or both of the top cover and the bottom cover include one or more fluid passages for flowing heating fluid from the liquid heating unit. The cooking apparatus includes a vacuum member that is in fluid communication with a food tray disposed between the top cover and bottom cover. The cooking apparatus further includes a control system configured to direct the removal of one or more gases (e.g., air) from the food tray and circulate heating fluid through the fluid passages for a predetermined period of time.

INCORPORATION BY REFERENCE

All publications, patents, and patent applications mentioned in this specification are herein incorporated by reference to the same extent as if each individual publication, patent, or patent reference was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

In embodiments of the invention, a heating apparatus is provided for cooking food items. In some embodiments, the heating apparatus is configured for slow cooking food items. In embodiments, the heating apparatus is configured for cooking food items under vacuum. Heating apparatuses and methods of embodiments of the invention can be used for sous-vide type (or sous-vide style) cooking.

Reference will now be made to the figures, wherein like numerals refer to like parts throughout. It will be appreciated that the figures and structures therein are not necessarily drawn to scale.

Figure 1:
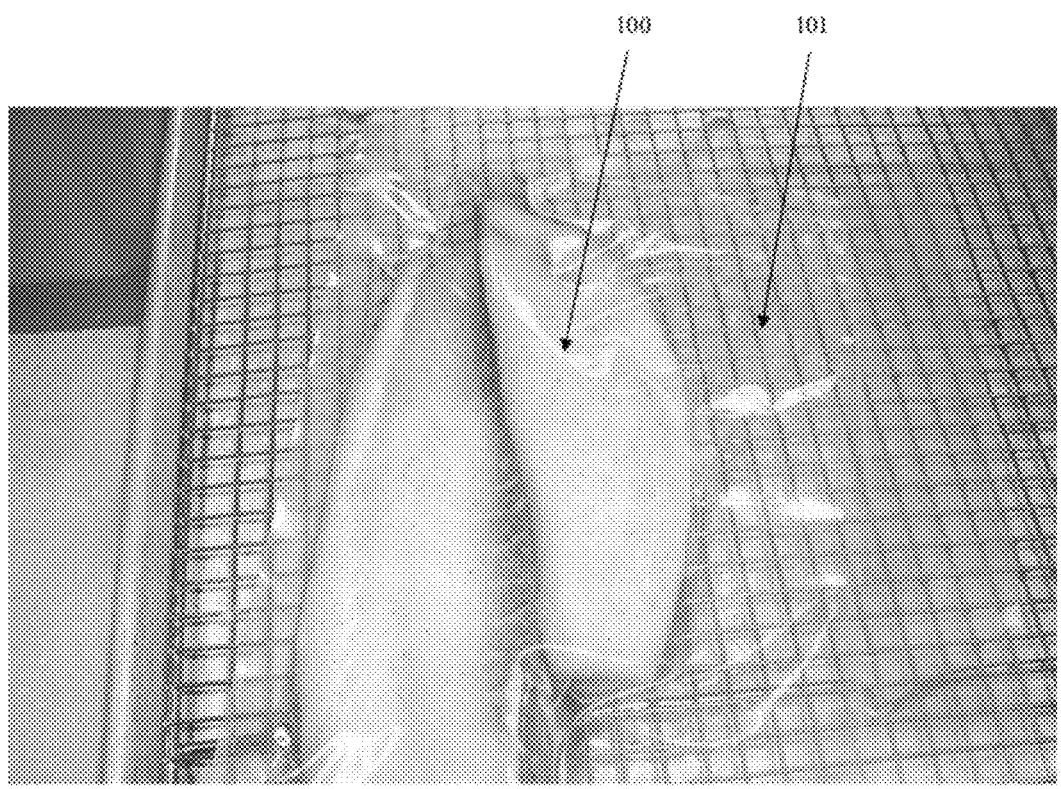
FIG. 1 shows a food item in a vacuum container, in accordance with an embodiment of the invention.

FIG. 1 shows a food item 100 in a vacuum container 101, in accordance with an embodiment of the invention. The food item 100 is at least partially covered with cooking oil (or the like) to facilitate cooking The vacuum container 101 having the food item 100 can be mounted to the cooking apparatuses of embodiments of the invention for slow cooking under vacuum.

Cooking Apparatuses

In an aspect of the invention, a cooking apparatus (also "cooker" herein) is provided for cooking food items. The cooking apparatus includes a vacuum pump for removing air from a compartment having the food item and a heating device for providing heat to the food item. In embodiment, the heating device comprises a circulating fluid (e.g., heating oil, water) that is heated to a desired (or predetermined temperature) before coming in contact with the food item. In an embodiment, the fluid is heated in a heat exchanger. The heated fluid is then brought in contact with a compartment having the food item. Heat is transferred from the fluid to the food item. Cold fluid (i.e., fluid at a lower temperature) is then recirculated to the heat exchanger for further heating. In some embodiment, the fluid can be brought in contract with a filter to remove any particles that can impede heat transfer.

Figure 2:
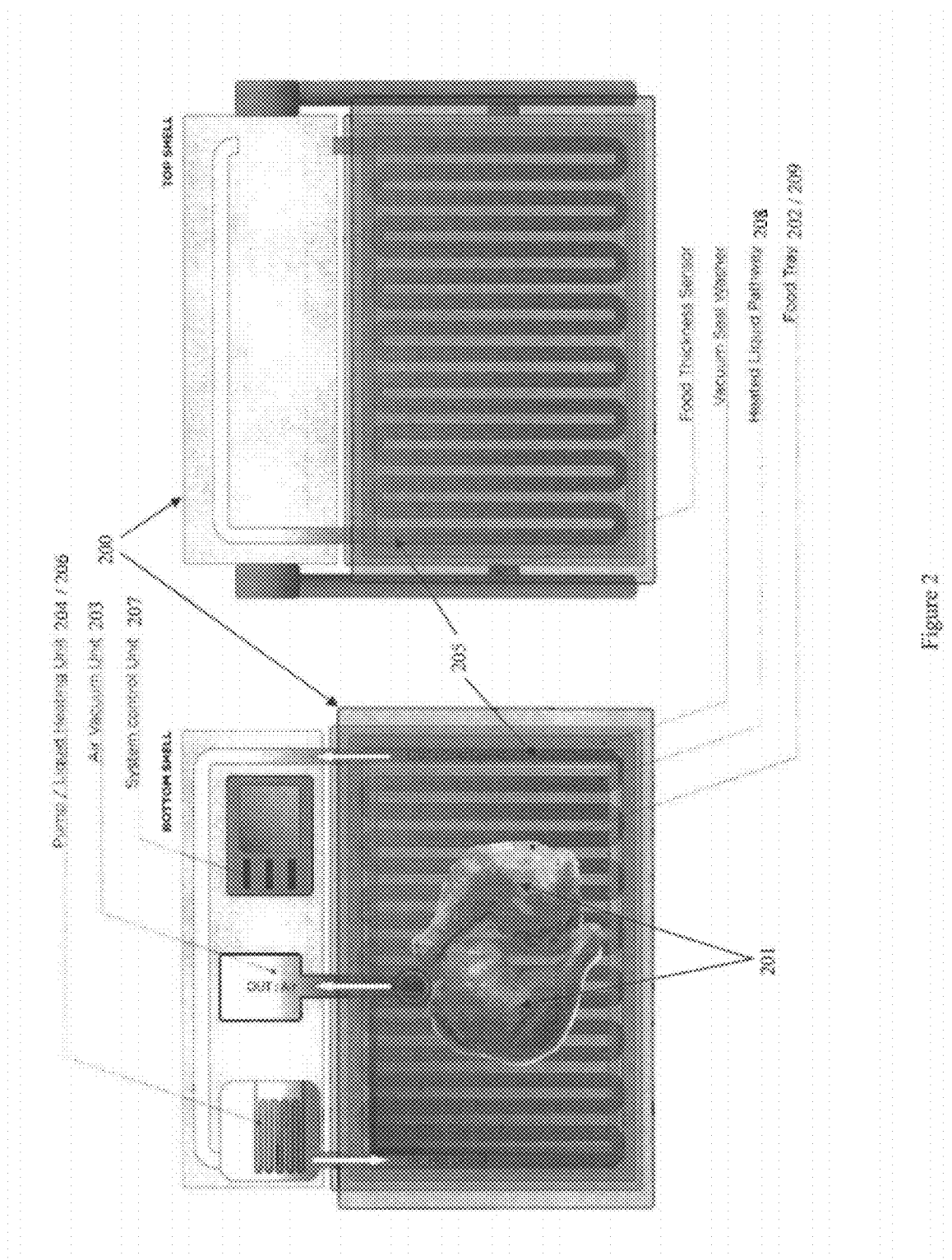
FIG. 2 schematically illustrates a cooking apparatus, in accordance with an embodiment of the invention.

FIG. 2 shows bottom (left) and top (right) views of a cooking apparatus 200, in accordance with an embodiment of the invention. A food item 201 (chicken, as illustrated) is disposed in a food tray 202 (see below) in the cooking apparatus 200. The cooking apparatus 200 includes an air vacuum unit (e.g., vacuum pump) 203 in fluid communication with the food tray 202. The cooking apparatus 200 further includes a liquid heating unit 204 for providing heat to a heat transfer medium 205, such as a circulating heating fluid. The liquid heating unit 204 further includes a pump 206 for circulating the liquid heating medium 205 during cooking. The liquid heating unit 204 can be a heat exchanger having a plurality of tubes that are in contact with a resistive heating element, for example. The cooking apparatus 200 further includes a system control unit 207, which is configured to cook the food item for a predetermined period of time. The system control unit 207 can control the cooking temperature, the removal of air (and other gases) from the food tray prior to cooking, and the circulation of the circulating fluid 205 during operation.

The liquid heating unit 204 and heating pathways 208 (or heating passages) operate as a closed loop. The heating fluid 205 is heated in the liquid heating unit 204 and circulated through the cooking apparatus 200. Heat is transferred to the food item as the heating fluid 205 traverses the cooking apparatus 200. Upon transfer of heat to the food item 201, the temperature of the heating fluid 205 decreases. Cool fluid is then returned to the liquid heating unit 204 for further heating. In an alternative embodiment, the liquid heating unit 204 can operate in an open-loop fashion such that new heating fluid is added at predetermined intervals.

With continued reference to FIG. 2, during operation, a food tray 202 having a food item 201 is disposed in the cooking apparatus 200 and the cooking apparatus 200 is closed. In some embodiments, the food tray 202 is omitted and the food item 201 is placed in the cooking apparatus 200 in a food compartment 209. Next, air is removed from the food tray 202 (or food compartment 209). Removal of air brings the food item 201 in contact with heat transfer elements 204 of the cooking apparatus 200 such that heat transfer during cooking is optimized. Next, with air removed from the food tray 202, heating fluid 205 at a first temperature is provided from the liquid heating unit 204 and directed through the cooking apparatus 200 through a liquid pathway 208 ("Heated Liquid Pathway", as illustrated). Hot circulating liquid 205 is provided to the cooking apparatus 200 along the direction of "IN: Hot Liquid" arrow. Heat is transferred to the food item 201 as the circulating liquid 205 (also "circulating fluid" herein) traverses the heated liquid pathway 208. Cool fluid leaves the area of the cooking apparatus 200 adjacent the food item 201 along the direction of the "OUT: Cold Liquid" arrow. Cool fluid is then returned to the liquid heating unit 204 for reheating. Hot liquid is then recirculated through the cooking apparatus.

Figure 3:
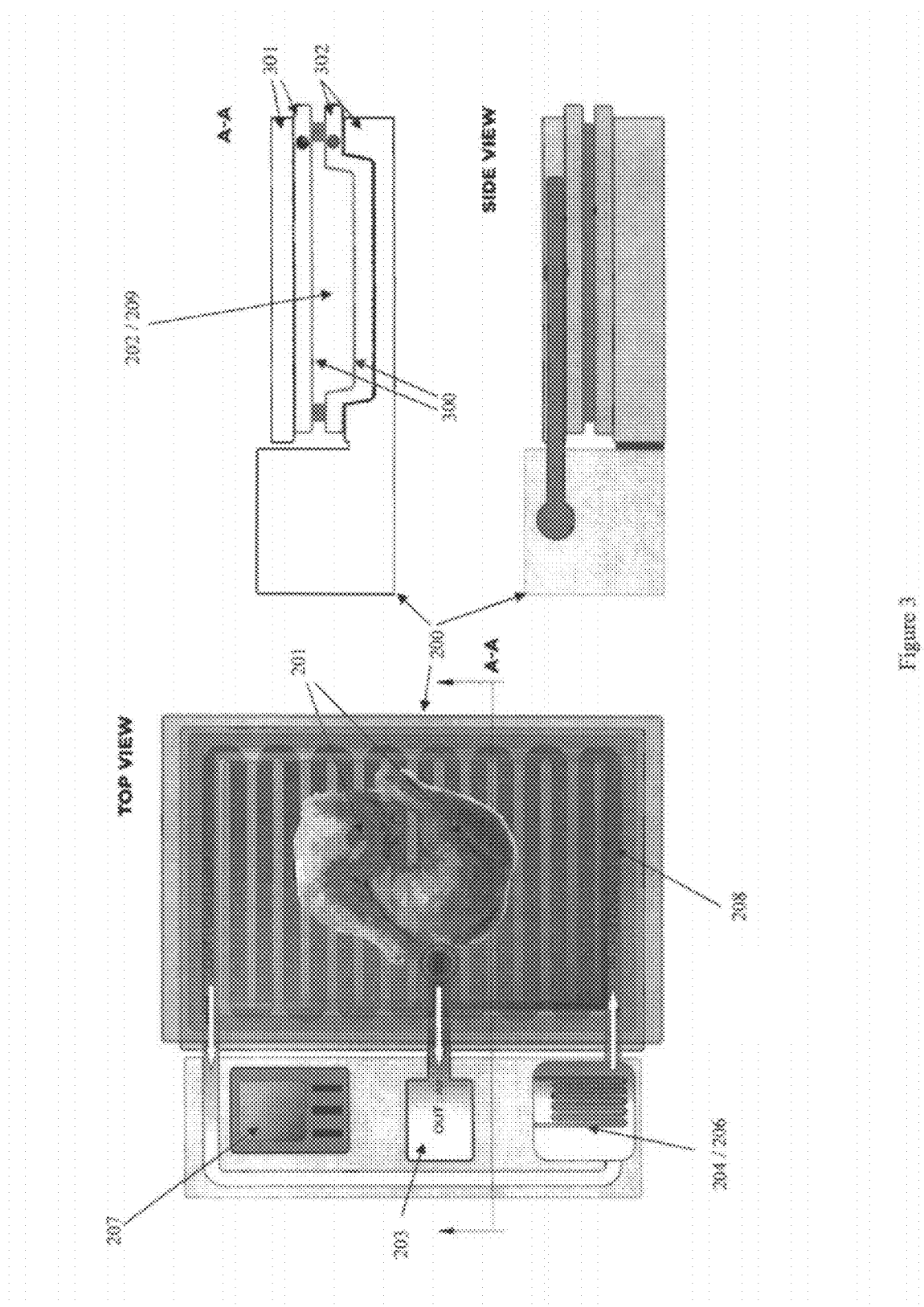
FIG. 3 schematically illustrates top and side views of the cooking apparatus of FIG. 2, in accordance with an embodiment of the invention.

FIG. 3 further illustrates the cooking apparatus 200 of FIG. 2, in accordance with an embodiment of the invention. FIG. 3 shows schematic top (left), cross-sectional side view (right-top, taken along line A-A), and side view of the cooking apparatus 200. The cooking apparatus 200 includes a top (or upper) portion 301 and a bottom (or lower) portion 302. The top portion 301, bottom portion 302, or both can include a heated liquid pathway 208 in fluid communication with liquid heating unit 204. In some embodiments, only the top portion 301 or the bottom portion 302 includes a heated liquid pathway 204. In embodiments, the top portion 301 and the bottom portion 302 include heat transfer surfaces 300 that are configured to come in contract with the food item 201 and to facilitate the transfer of heat to and from the food item 201 in the food tray 202. At least portions of the top portion 301 and the bottom portion 302 can be formed of a malleable (or deformable) polymeric material. In an embodiment, the top portion 301 and the bottom portion 302 each include a layer of a polymeric material that is configured to come in contact with a food item 201 when vacuum is applied to the food compartment 209 of the cooking apparatus 200. In some cases, the top 301 and bottom portions 302 can include layers of a metallic material to facilitate heat transfer. For instance, the top 301 and bottom portions 302 can each include a layer of aluminum that is configured to come in contact with a food item 201.

With continued reference to FIG. 3, in an embodiment, the top portion 301 and the bottom portion 302 define a food tray 202 configured to house or hold a food item 201. During operation, with the food item 201 disposed in the food tray 202, the air vacuum unit 203 (or pump) removes air from the food tray 202, thereby forming a vacuum in the food tray 202. Upon the application of vacuum to the food tray 202, the contact (also thermal contact) between the heat transfer surfaces 300 of each of the top and bottom portions of the cooking apparatus is improved, thereby facilitating the cooking of the food item 201 when the cooking apparatus 200 is in use.

With continued reference to FIGS. 2 and 3, the heated liquid pathway 208 is oriented so as to optimize the efficiency of heat transfer to the food item 201. The heating elements in the liquid heating unit 204 can be resistive heating coils that are in thermal contact with a portion of the heated liquid pathway 208 in the liquid heating unit 204. In an alternative embodiment, the liquid heating unit 204 is a heat exchanger having a first tube with a first fluid (e.g., water or steam) at a high temperature and a second tube having a second fluid (e.g., water or oil) at a lower temperature compared to the temperature of the first fluid entering the liquid heating unit 204. The first tube and second tube are in thermal contact with one another, and the second fluid is heated to a higher temperature in a counterflow type fashion. The second fluid is then circulated through the cooking apparatus 200 to provide heat to the food item 201 in the cooking apparatus 200.

With continued reference to FIGS. 2 and 3, while the cooking apparatus 200 includes one heated liquid pathway 208, the cooking apparatus 200 can include any number and configuration of liquid pathways 208. For example, the cooking apparatus 200 can include two liquid pathways 208 in fluid communication with one or more liquid heating units (having pumps) 204/206.

Methods for Using Cooking Apparatuses

In an aspect of the invention, methods for using cooking apparatuses are provided.

Figure 4:
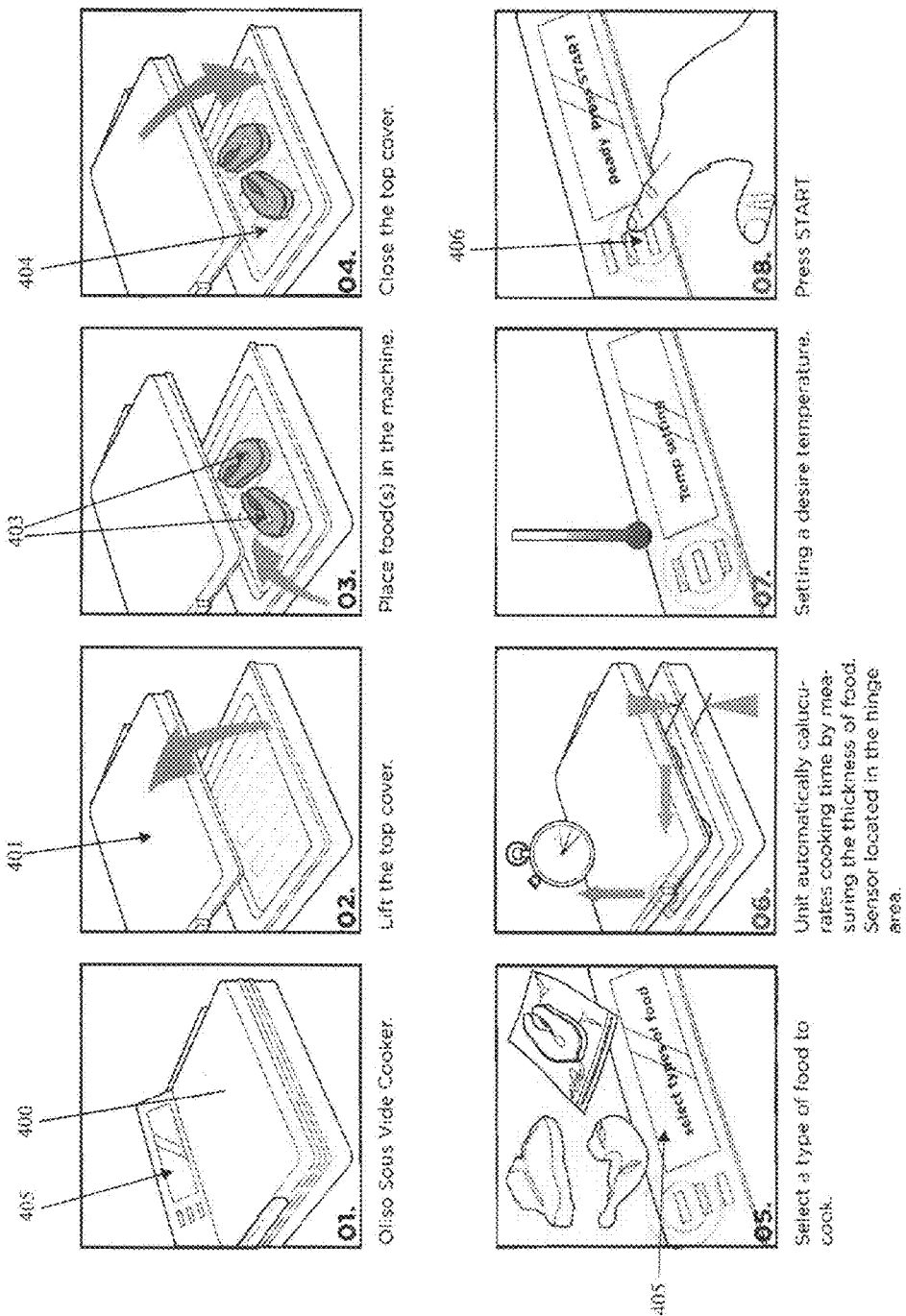
FIGS. 4-6 schematically illustrate a method for operating the cooking apparatus, in accordance with an embodiment of the invention.

With reference to FIG. 4, in a first step, a cooking apparatus 400 ("Sous Vide Cooker", as illustrated) is provided having a top cover 401 and a bottom cover 402. Next, in step two, the top cover 401 is lifted. Next, in step three, one or more food items 403 are placed in the cooker. Next, in step four, the top cover 401 is closed. Closing the top cover 401 seals the food item 403 in the food tray 404 of the cooker 400. In a fifth step, in the system control unit 405 of the cooker 400 (see above), the user can select the type of food desired for cooking The cooker can select heating parameters (e.g., temperature and time) suitable to a particular type of food. For example, the user can select a long cooking time at a low temperature or a short cooking time at a high temperature. In a sixth step, the system control unit 405 calculates the cooking profile (i.e., cooking time, cooking temperature) by measuring the thickness of the food with the aid of one or more sensors disposed in a hinge area of the cooker (see FIG. 2). Next, in a seventh step, the system control unit 405 sets a temperature for cooking The temperature is selected based on the type of food, the thickness of the food, or both.

In an alternative embodiment, the user can input user-defined times and temperatures. This can advantageously permit a use to cook several different types of foods at the same time. For example, the user can cook a first type of meat and a second type of meat simultaneously by inputting the desired cooking time and temperature.

With continued reference to FIG. 4, in an eighth step, the user presses the start button 406 to begin the cooking process. In an alternative embodiment, the cooker can begin the cooking process automatically upon the completion of a predetermined event, such as the user inserting a food item in the food tray.

Figure 5:
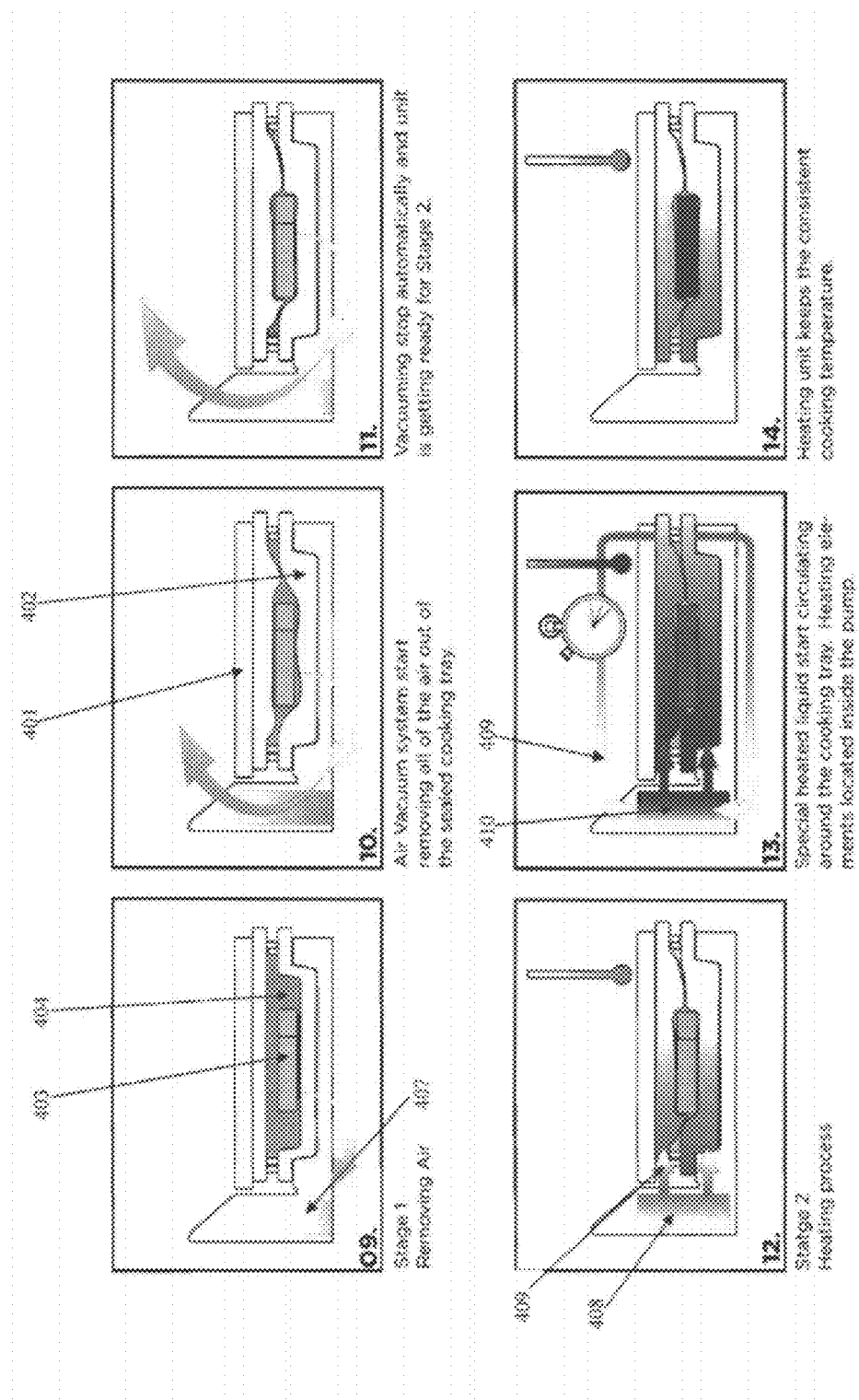

With reference to FIG. 5, in a ninth step, the air vacuum system (or unit) 407 begins to remove air and any other gases from the food tray (also "food compartment" herein). In a tenth step, surfaces of the top portion 401 and the bottom portion 402 of the cooker have come in contact with the food item 403. The air vacuum system 407 will continue to remove air from the sealed cooking tray 404. The continual removal of air from the food tray forms a seal between the food tray 404 and the external environment. In an embodiment, the seal is a hermetic seal. In an eleventh step, vacuuming will stop automatically when the cooker is ready to commence cooking the food item 403. In an alternative embodiment, the air vacuum system 407 will continue to remove air from the food tray 404 during cooking.

Next, in a twelfth step, the heating process begins by directing heated liquid 408 to the heated liquid pathway 409 of the cooker. In a thirteenth step, as the heated liquid 408 is cooled (via energy transfer to the food item 403 in the food tray 404), cooled liquid 408 is returned (or recycled) to the liquid heating unit 410 to be reheated. In the illustrated embodiment, the heated liquid 408 is heated by a heating element (e.g., resistive heating element) disposed in a pump 410 that is used to circulate the heated liquid 408. Next, in a fourteenth step, cooking continues for a predetermined time at a set, predetermined temperature.

Figure 6:
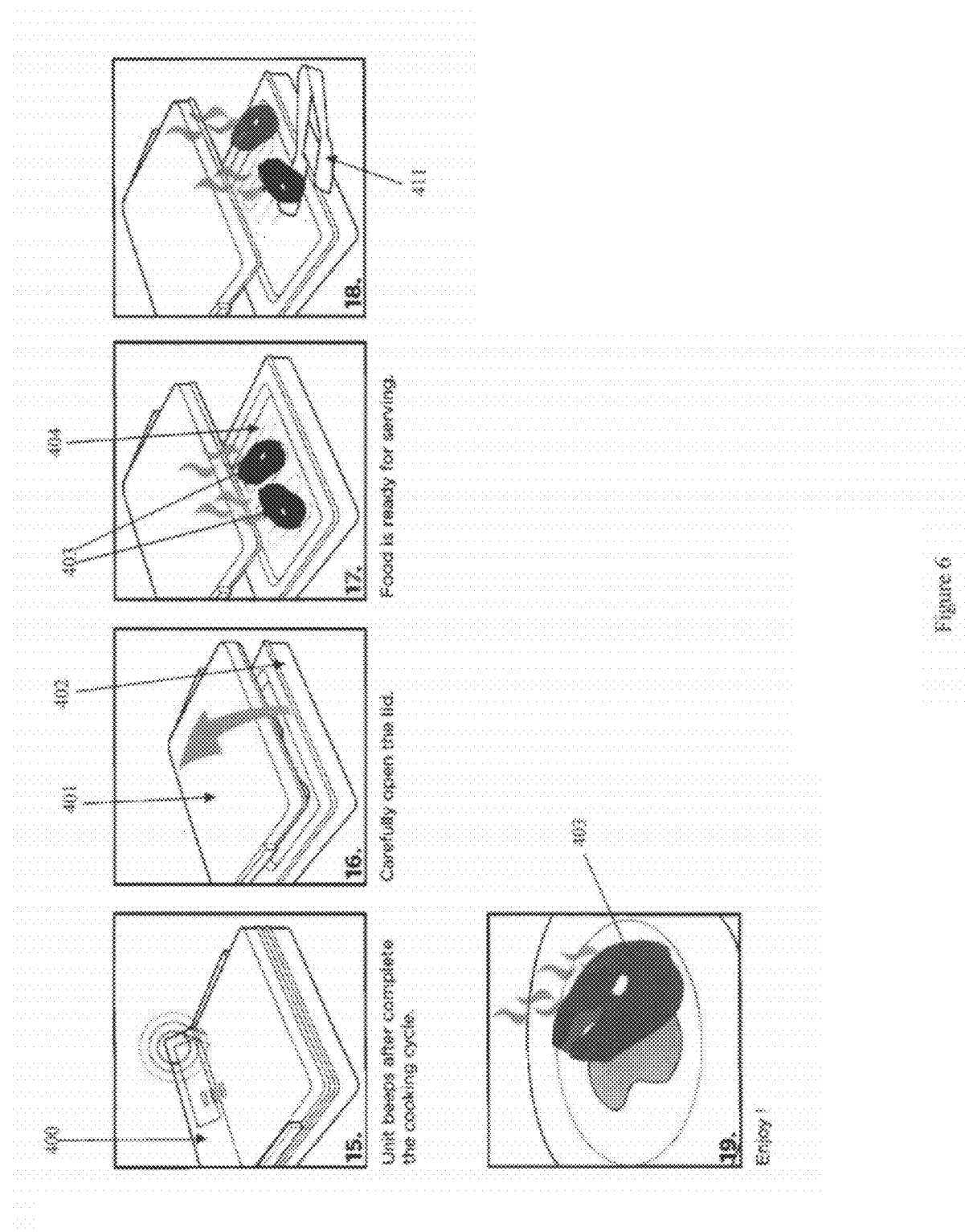

With reference to FIG. 6, in a fifteenth step, the cooker 400 provides an audible alarm when cooking is complete, such as, e.g., after a predetermined period of time has elapsed or if the thickness of the food item has changed by a predetermined value. In a sixteenth step, the user opens the top portion (also "lid" herein) 401 of the cooker. In a seventeenth step, the food item(s) disposed in the food tray 404 are ready for serving. In an eighteenth step, the food items 403 are removed with the aid of one or more utensils 411. In a nineteenth step, the food items 403 are served for consumption.

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein can be employed in practicing the invention.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents. It is intended that the following claims define the scope of the invention and that methods and structures within the scope of these claims and their equivalents be covered thereby.

I claim:

1. A cooking apparatus, comprising:
   a top cover comprising a first fluid reservoir having a flexible bottom surface;
   a bottom cover disposed beneath said top cover, said bottom cover comprising a second fluid reservoir having a flexible top surface;
   a liquid heating unit in fluid communication with said first and second fluid reservoirs;
   a vacuum seal washer disposed between said bottom cover and said top cover; and
   an air vacuum unit in fluid communication with a void formed between said top cover and said bottom cover when said top cover is closed against said bottom cover;
   wherein said air vacuum unit is not in fluid communication with said first and second fluid reservoirs and said flexible bottom surface of fluid reservoir in said top cover and said flexible top surface of said fluid reservoir in said bottom cover displace toward one another when said air vacuum unit removes air from said void formed between said top cover and said bottom cover.

2. The cooking apparatus of claim 1, further comprising a heating fluid contained in said first and second fluid reservoirs.

3. The cooking apparatus of claim 1, further comprising a food thickness sensor adapted to measure a thickness of a food item placed between said bottom surface and said top surface.

4. The cooking apparatus of claim 2, wherein said liquid heating unit comprises a pump configured to circulate said heating fluid through said first fluid reservoir.

5. The cooking apparatus of claim 1, wherein when a food item is placed between said flexible top surface of said fluid reservoir in said bottom cover and said flexible bottom surface of said fluid reservoir in said top cover and said top cover is closed against said bottom cover, said air vacuum unit causes said flexible bottom surface to contact the food item.

6. The cooking apparatus of claim 1, further comprising a system control unit adapted to control a cooking temperature and a cooking time duration.

7. The cooking apparatus of claim 1, wherein said liquid heating unit comprises a resistive heating element.

8. The cooking apparatus of claim 1, wherein said first fluid reservoir comprises a serpentine fluid path.

9. The cooking apparatus of claim 1, wherein said second fluid reservoir comprises a serpentine fluid path.

10. The cooking apparatus of claim 1, wherein said bottom cover further comprises said liquid heating unit.

11. The cooking apparatus of claim 1, wherein said bottom cover further comprises said air vacuum unit.

12. A cooking apparatus, comprising:
- a top cover comprising a first fluid reservoir having a flexible bottom surface;
- a bottom cover disposed beneath said top cover, said bottom cover comprising a second fluid reservoir having a flexible top surface;
- a first liquid heating unit in fluid communication with said first fluid reservoir;
- a second liquid heating unit in fluid communication with said second fluid reservoir;
- a vacuum seal washer disposed between said bottom cover and said top cover; and
- an air vacuum unit in fluid communication with a void formed between said top cover and said bottom cover when said top cover is closed against said bottom cover;
- wherein said air vacuum unit is not in fluid communication with either of said first and second fluid reservoirs and said flexible bottom surface of said top cover and said flexible top surface of said bottom cover displace toward one another when said air vacuum unit removes air from said void formed between said top cover and said bottom cover.

\* \* \* \* \*